US009892553B2

(12) United States Patent
Yoo et al.

(10) Patent No.: US 9,892,553 B2
(45) Date of Patent: Feb. 13, 2018

(54) APPARATUS AND METHOD FOR PROVIDING IMAGE-BASED INDOOR MAP

(71) Applicant: ELECTRONICS AND TELECOMMUNICATIONS RESEARCH INSTITUTE, Daejeon (KR)

(72) Inventors: Jae-Jun Yoo, Daejeon (KR); So-Yeon Lee, Daejeon (KR); Sang-Joon Park, Daejeon (KR); Sung-Woong Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/183,988

(22) Filed: Jun. 16, 2016

(65) Prior Publication Data
US 2017/0069130 A1    Mar. 9, 2017

(30) Foreign Application Priority Data

Sep. 8, 2015   (KR) .................. 10-2015-0127229
Feb. 26, 2016  (KR) .................. 10-2016-0023052

(51) Int. Cl.
G06T 15/00   (2011.01)
G06T 17/05   (2011.01)
G06F 17/30   (2006.01)

(52) U.S. Cl.
CPC ........ G06T 17/05 (2013.01); G06F 17/30241 (2013.01); *G06T 2210/36* (2013.01)

(58) Field of Classification Search
CPC ......... G06T 19/00; G06T 17/20; G06T 17/00; G06T 15/10; G06T 15/00
USPC ........................................... 345/419
See application file for complete search history.

(56) References Cited

U.S. PATENT DOCUMENTS 9,142,051 B2      9/2015  Kwak
2013/0338972 A1*  12/2013 Chao .................. G06F 17/5009
                                              703/1
2014/0113661 A1   4/2014  Yoo et al.
2014/0122031 A1   5/2014  Lee
(Continued)

FOREIGN PATENT DOCUMENTS

KR   10-2012-0072124 A    7/2012
KR   10-2012-0140380 A   12/2012
KR   10-2015-0076796 A    7/2015

*Primary Examiner* — Ke Xiao
*Assistant Examiner* — Gordon Liu
(74) *Attorney, Agent, or Firm* — LRK Patent Law Firm

(57) ABSTRACT

An apparatus and method for providing an image-based indoor map. The apparatus for providing an image-based indoor map includes an indoor map request reception unit for receiving an indoor map request for a building having multiple floors from a terminal of a user, an indoor map acquisition unit for acquiring an indoor map corresponding to the building in response to the indoor map request from an indoor map database (DB), and an indoor map provision unit for providing the terminal of the user with information about at least one of multiple image indoor maps, in which multiple floors and Levels of Detail (LoDs) of each image are taken into consideration, and Points of Interest (POIs) for respective multiple floors, based on the indoor map.

16 Claims, 15 Drawing Sheets

(56) References Cited

U.S. PATENT DOCUMENTS

| | | | |
|---|---|---|---|
| 2014/0253538 A1* | 9/2014 | Bailiang | G06T 15/08 345/419 |
| 2015/0006100 A1* | 1/2015 | Jackson | G01C 5/06 702/94 |
| 2015/0095350 A1* | 4/2015 | Chen | G06F 17/27 707/749 |
| 2015/0185022 A1 | 7/2015 | Yoo et al. | |

* cited by examiner

| ITEM | DESCRIPTION |
|---|---|
| UpdateDate | CONSTRUCTION OR UPDATE DATE OF INDOOR MAP |
| Version | VERSION OF INDOOR MAP |
| NumOfFloors | TOTAL NUMBER OF FLOORS REPRESENTED BY INTERNAL IMAGE INDOOR MAPS |
| StartFloorNo, EndFloorNo | START FLOOR NUMBER AND END FLOOR NUMBER REPRESENTED BY INTERNAL IMAGE INDOOR MAPS |
| IndoorMapMappingInfo | PIECES OF INFORMATION USED WHEN IMAGE INDOOR MAPS ARE MAPPED TO OUTDOOR SPACE, AND CONFIGURED TO BASICALLY INCLUDE THE FOLLOWING ITEMS:<br>- LINK POINTS BETWEEN IMAGE INDOOR MAPS AND OUTDOOR SPACE, AND TYPES OF COORDINATE SYSTEMS FOR DESCRIBING OUTLINE<br>- LOCATIONS OF LINK POINTS BETWEEN IMAGE INDOOR MAPS AND OUTDOOR SPACE (LOCATIONS IN OUTLINE) (E.G. WHETHER LINK POINTS ARE LOCATED AT CENTER OF OUTLINE OR ARE LOCATED AT CERTAIN CORNERS OF OUTLINE, ETC.)<br>- UNIT OF RELATIVE COORDINATES WHEN LINK POINTS COMPLY WITH RELATIVE COORDINATES<br>- ANGLE BETWEEN DUE NORTH AND OUTLINE, ETC. |
| Outline | OUTLINE OF INDOOR MAPS REPRESENTED BY SET OF IMAGE INDOOR MAPS |
| Description | ADDITIONAL DESCRIPTION OF CONFIGURATION OF INDOOR MAPS |

| ITEM | DESCRIPTION |
|---|---|
| FloorNo | NUMBER OF FLOOR DESIRED TO BE REPRESENTED BY IMAGE |
| NumOfLoD | TOTAL NUMBER OF LoDS OF IMAGE |
| LoDNo | LEVEL OF DETAIL (LoD) OF IMAGE |
| ImageTypeE | IMAGE TYPE (JPG, PCX, PNG, ETC.) |
| ImageResolution | IMAGE RESOLUTION |
| ImagePath | PATH OF IMAGE WHEN IMAGE IS NOT DIRECTLY INCLUDED IN THIS PACKAGE (FOR REFERENCE, ONE OF IMAGE PATH AND IMAGE DATA MUST ESSENTIALLY BE DESIGNATED) |
| ImageData | BINARY DATA OF IMAGE (IMAGE DATA ITSELF) WHEN IMAGE IS INCLUDED IN THIS PACKAGE |
| ImageSize | SIZE OF IMAGE |
| Description | ADDITIONAL DESCRIPTION OF IMAGE INDOOR MAPS |
| ADDITIONAL INFORMATION | ADDITIONAL ATTRIBUTES OF IMAGE |

FIG. 5

| ITEM | DESCRIPTION |
|---|---|
| FloorNo | NUMBER OF FLOOR ON WHICH POI IS PRESENT |
| NumOfPOIs | NUMBER OF POIS PRESENT ON CORRESPONDING FLOOR |
| ID | IDENTIFIER OF POI |
| Type | KIND AND TYPE OF POI |
| Location | LOCATION OF POI (LOCATION IN INDOOR SPACE) |
| Name | NAME OF POI |
| ImagePath | PATH OF POI IMAGE WHEN ICON OF POI IS NOT DIRECTLY INCLUDED IN THIS PACKAGE |
| ImageData | BINARY DATA OF POI IMAGE (BINARY DATA ITSELF) WHEN ICON OF POI IS INCLUDED IN THIS PACKAGE |
| Description | ADDITIONAL DESCRIPTION OF POI |
| ADDITIONAL INFORMATION | ADDITIONAL ATTRIBUTES OF POI |

FIG. 6

APPARATUS AND METHOD FOR PROVIDING IMAGE-BASED INDOOR MAP

CROSS REFERENCE TO RELATED APPLICATIONS

This application claims the benefit of Korean Patent Application Nos. 10-2015-0127229, filed Sep. 8, 2015 and 10-2016-0023052, filed Feb. 26, 2016, which are hereby incorporated by reference in their entirety into this application.

BACKGROUND OF THE INVENTION

1. Technical Field

The present invention generally relates to the provision of an image indoor map and, more particularly, to an apparatus and method for providing an image-based indoor map, which can provide an image-format indoor map of indoor space that can be used for various indoor location-based services.

2. Description of the Related Art

Recently, as the structure of indoor space becomes more and more complicated, as in the case of large-scale shopping malls and convention centers, and as a large part of human life is conducted indoors, the importance of services provided based on various types of indoor information, for example, indoor location-based services such as indoor navigation and indoor emergency rescue and recovery, has increased. Accordingly, research into related technologies and the development of related systems have been actively conducted.

Such indoor location-based service needs indoor maps as basic data required in order to visualize a specific indoor space or to efficiently deliver information about the area surrounding a user terminal. The indoor maps that are used require different formats and characteristics depending on the function, range, or the like of indoor location-based service.

Similar to a map of outdoor space, a map of indoor space may also be represented in the form of a vector or an image. The vector-format indoor map is advantageous in that, even if the map is magnified or reduced, it is not distorted, but it is disadvantageous in that the procedure for constructing the map is generally complicated and requires a lot of expense. In contrast, the image-format indoor map is disadvantageous in that, when the map is magnified or reduced, it may be distorted, but it is advantageous in that the map may be more simply visualized, and the construction expense thereof may be further reduced depending on the range of visualization. The vector-format indoor map and the image-format indoor map may be suitably utilized depending on the requirements of indoor location-based service that utilizes indoor maps.

Most indoor maps have recently been constructed and provided in the form of vectors, but requirements for image-format indoor maps have gradually increased owing to the simplicity and utilization of image-format indoor maps. Furthermore, in many cases, vector-format indoor maps are occasionally converted into and utilized as image-format indoor maps for the purpose of simpler and more efficient visualization.

However, as described above, the image-format indoor maps are disadvantageous in that images may be distorted when the map is magnified or reduced. Further, in most cases, indoor space is generally characterized by having a stacked vertical structure, but a typical image-based indoor map represents a 2D-format plane, thus making it difficult to represent indoor space using such a 2D-format plane.

In connection with this, Korean Patent Application Publication No. 10-2015-0076796 discloses a technology related to "3-Dimensional Indoor Route Providing Apparatus, System and the Method."

SUMMARY OF THE INVENTION

Accordingly, the present invention has been made keeping in mind the above problems occurring in the prior art, and an object of the present invention is to construct and represent an indoor map, which is to be essentially provided in order to visualize and refer to indoor space in various types of indoor location-based services provided for the indoor space, in the form of an image.

Another object of the present invention is to provide an image indoor map, in which indoor space having the characteristics of a three-dimensional (3D) structure, such as a stacked structure, may be represented at various visualization levels (Levels of Detail) without being distorted.

A further object of the present invention is to exchange image indoor maps that are constructed by various entities together with clear meanings by utilizing a method of structuring and packaging images required to represent indoor space, thus reducing the expense required to construct and utilize indoor maps.

In accordance with an aspect of the present invention to accomplish the above objects, there is provided an apparatus for providing an image-based indoor map, including an indoor map request reception unit for receiving an indoor map request for a building having multiple floors from a terminal of a user; an indoor map acquisition unit for acquiring an indoor map corresponding to the building in response to the indoor map request from an indoor map database (DB); and an indoor map provision unit for providing the terminal of the user with information about at least one of multiple image indoor maps, in which multiple floors and Levels of Detail (LoDs) of each image are taken into consideration, and Points of Interest (POIs) for respective multiple floors, based on the indoor map.

The indoor map DB may be configured to generate at least one piece of configuration information corresponding to the indoor map in a form of eXtensible Markup Language (XML) instances corresponding to an XML schema, and to structure and manage the indoor map based on the XML instances.

The XML instances may be generated to respectively correspond to indoor space information corresponding to the building, image indoor map attribute information, indoor map provider information, image indoor maps based on the multiple floors, image indoor maps based on the LoDs of each image, and the POIs based on the multiple floors.

The XML schema may include an IndoorImageMap class corresponding to the indoor map, the IndoorImageMap class may include at least one of an IndoorFloorImage class corresponding to image indoor maps of respective multiple floors and an IndoorFloorPOIs class corresponding to POIs present on the respective multiple floors, and the IndoorFloorImage class may be implemented as a set of values of an IndoorImage class corresponding to image indoor maps based on the LoDs of each image.

The indoor map DB may be configured to sequentially input indoor space information corresponding to the building, image indoor map attribute information, image indoor maps, indoor POIs, and indoor map provider information to a binary file, wherein the image indoor maps and the indoor POIs are successively input for respective floors.

The binary file may be configured such that, in order to improve speed of access to the image indoor maps, floor descriptors, to which start locations of the image indoor maps of respective floors are input, are included in a heading portion of the image indoor maps, and LoD descriptors, to which start locations of the image indoor maps for respective LoDs are input, are included in a portion subsequent to the floor descriptors.

The indoor map may include information included in the multiple image indoor maps, the information being at least one of a number of a floor corresponding to each image indoor map, a number of LoDs, an LoD, an image type of the image indoor map, an image resolution of the image indoor map, an image path of the image indoor map, image data of the image indoor map, an image size of the image indoor map, and additional information.

The indoor map may include information included in the POIs for respective multiple floors, the information being at least one of a number of a floor on which each POI is present, a number of POIs corresponding to the floor on which each POI is present, a POI identifier, a POI type, a POI location, a POI name, a POI image path, POI image data, and additional information.

The indoor map may include mapping information required to map the multiple image indoor maps to outdoor space, together with attribute information corresponding to at least one of the multiple image indoor maps and the POIs for respective multiple floors, wherein the mapping information and the attribute information are included in the image indoor map attribute information.

The indoor map may include information about at least one of an identifier, a name, an address, contact information, and additional information, which are included in the indoor map provider information.

The indoor map may include information about at least one of an identifier, an address, a name, and an additional description of indoor space corresponding to the building, which are included in the indoor space information.

In accordance with an aspect of the present invention to accomplish the above objects, there is provided a method for providing an image-based indoor map, including receiving an indoor map request for a building having multiple floors from a terminal of a user; acquiring an indoor map corresponding to the building in response to the indoor map request from an indoor map database (DB); and providing the terminal of the user with information about at least one of multiple image indoor maps, in which multiple floors and Levels of Detail (LoDs) of each image are taken into consideration, and Points of Interest (POIs) for respective multiple floors, based on the indoor map.

The indoor map DB may be configured to generate at least one piece of configuration information corresponding to the indoor map in a form of eXtensible Markup Language (XML) instances corresponding to an XML schema, and to structure and manage the indoor map based on the XML instances.

The XML instances may be generated to respectively correspond to indoor space information corresponding to the building, image indoor map attribute information, indoor map provider information, image indoor maps based on the multiple floors, image indoor maps based on the LoDs of each image, and the POIs based on the multiple floors.

The XML schema may include an IndoorImageMap class corresponding to the indoor map, the IndoorImageMap class may include at least one of an IndoorFloorImage class corresponding to image indoor maps of respective multiple floors and an IndoorFloorPOIs class corresponding to POIs present on the respective multiple floors, and the IndoorFloorImage class may be implemented as a set of values of an IndoorImage class corresponding to image indoor maps based on the LoDs of each image.

The indoor map DB may be configured to sequentially input indoor space information corresponding to the building, image indoor map attribute information, image indoor maps, indoor POIs, and indoor map provider information to a binary file, wherein the image indoor maps and the indoor POIs are successively input for respective floors.

The binary file may be configured such that, in order to improve speed of access to the image indoor maps, floor descriptors, to which start locations of the image indoor maps of respective floors are input, are included in a heading portion of the image indoor maps, and LoD descriptors, to which start locations of the image indoor maps for respective LoDs are input, are included in a portion subsequent to the floor descriptors.

The indoor map may include information included in the multiple image indoor maps, the information being at least one of a number of a floor corresponding to each image indoor map, a number of LoDs, an LoD, an image type of the image indoor map, an image resolution of the image indoor map, an image path of the image indoor map, image data of the image indoor map, an image size of the image indoor map, and additional information.

The indoor map may include information included in the POIs for respective multiple floors, the information being at least one of a number of a floor on which each POI is present, a number of POIs corresponding to the floor on which each POI is present, a POI identifier, a POI type, a POI location, a POI name, a POI image path, POI image data, and additional information.

The indoor map may include mapping information required to map the multiple image indoor maps to outdoor space, together with attribute information corresponding to at least one of the multiple image indoor maps and the POIs for respective multiple floors, wherein the mapping information and the attribute information are included in the image indoor map attribute information.

The indoor map may include information about at least one of an identifier, a name, an address, contact information, and additional information, which are included in the indoor map provider information.

The indoor map may include information about at least one of an identifier, an address, a name, and an additional description of indoor space corresponding to the building, which are included in the indoor space information.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing a representative configuration of image indoor map attribution information according to an embodiment of the present invention;

FIG. 5 is a diagram showing a representative configuration of image indoor maps according to an embodiment of the present invention;

FIG. 6 is a diagram showing a representative configuration of indoor POIs according to an embodiment of the present invention;

DESCRIPTION OF THE PREFERRED EMBODIMENTS

Figure 1:
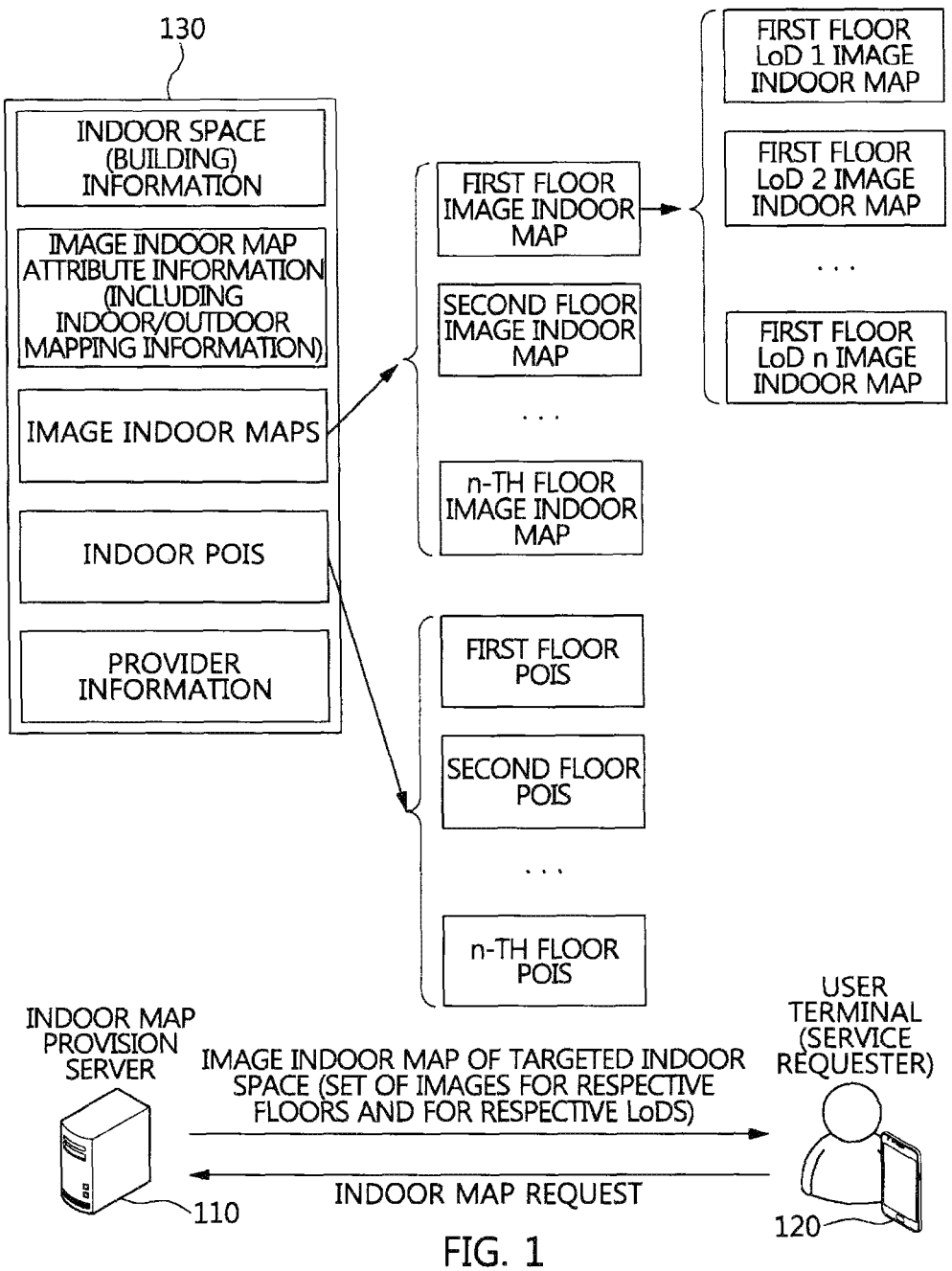
FIG. 1 is a diagram showing a system for providing an image-based indoor map according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram showing a system for providing an image-based indoor map according to an embodiment of the present invention.

Referring to FIG. 1, a system for providing an image-based indoor map according to an embodiment of the present invention includes an indoor map provision server 110, a user terminal 120, and an indoor map 130.

Here, the indoor map provision server 110 may correspond to an apparatus for providing an image-based indoor map according to the embodiment of the present invention.

That is, as shown in FIG. 1, when the indoor map provision server 110 receives an indoor map request from the user terminal 120, the indoor map provision server 110 may provide an image indoor map of a targeted indoor space, requested by a user, to the user terminal 120.

The provided image indoor map may correspond to image indoor maps of respective floors of the targeted indoor space and image indoor maps for respective visualization levels (Levels of Detail, LoDs).

The provided indoor map 130 may be configured to correspond to indoor space information, image indoor map attribute information, image indoor maps, indoor Points of Interest (POIs), and indoor map provider information, as shown in FIG. 1.

Here, the indoor space information may be information about a building corresponding to the indoor space.

The image indoor map attribute information may be attribute information about images indicating the indoor space.

The indoor map provider information may be information about a provider who provides image indoor maps and indoor POIs.

The image indoor maps may include image indoor maps of respective floors of the building and image indoor maps depending on LoDs for respective floors.

Furthermore, the indoor POIs may include POIs for respective floors, similar to the image indoor maps.

Therefore, an image-based indoor map, in which indoor space having a vertical structure may be visualized at various LoDs without being distorted, may be provided to the user based on the image indoor maps of respective floors and respective LoDs.

Figure 2:
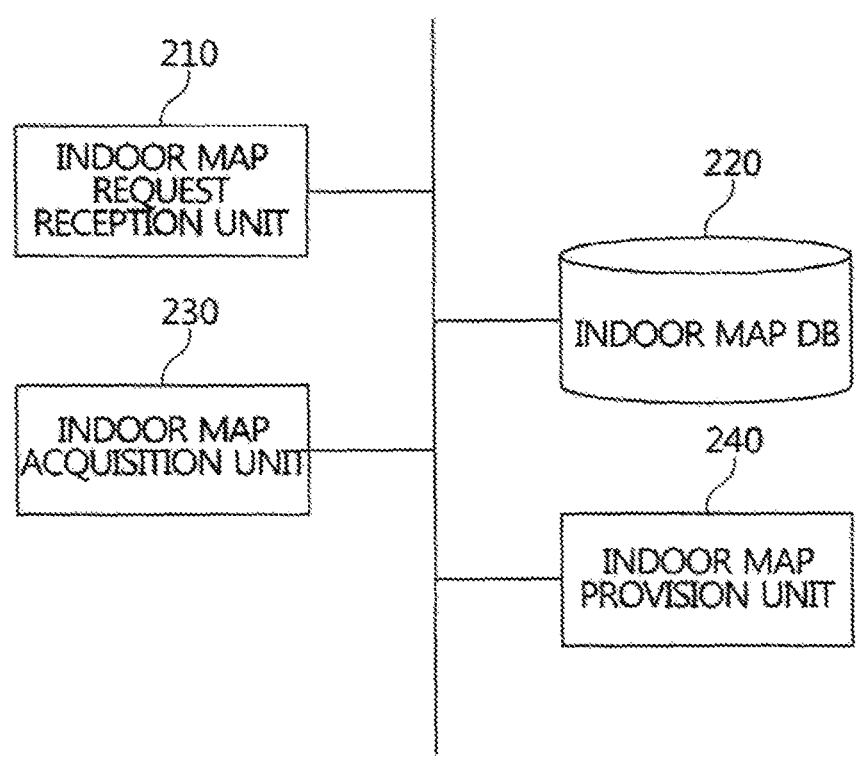
FIG. 2 is a block diagram showing an apparatus for providing an image-based indoor map according to an embodiment of the present invention.

FIG. 2 is a block diagram showing an apparatus for providing an image-based indoor map according to an embodiment of the present invention.

Referring to FIG. 2, the apparatus for providing an image-based indoor map according to an embodiment of the present invention includes an indoor map request reception unit 210, an indoor map database (DB) 220, an indoor map acquisition unit 230, and an indoor map provision unit 240.

The indoor map request reception unit 210 may receive an indoor map request for a building having multiple floors from the terminal of a user.

Here, the indoor map request may include information about the building, provided from the terminal of the user. For example, when the user inputs identification information required to identify a building, such as the name or address of the building, via the terminal, the input information may be transmitted to the indoor map provision apparatus, with the information included in the indoor map request.

Here, the indoor map request reception unit 210 may receive the indoor map request from the terminal of the user over a network.

Here, the network may be a path through which data is transferred between the indoor map provision apparatus and the user terminal, and is a concept including all existing networks and networks that may be developed in the future. For example, the network may be any one of a wired/wireless Local Area Network (LAN) for providing communication between various types of information devices in a limited area, a mobile communication network for providing communication between individual moving objects and between a moving object and the system outside the moving object, a satellite communication network for providing communication between individual earth stations using satellites, and a wired/wireless communication network, or may be a combination of two or more such networks. Meanwhile, transmission system standards for the network are not limited to existing transmission system standards and may include all transmission system standards that will be developed in the future.

The indoor map DB 220 may generate at least one piece of configuration information corresponding to an indoor map in the form of eXtensible Markup Language (XML) instances corresponding to an XML schema, and may structure and manage the image map based on the XML instances.

Here, the XML instances may be generated to respectively correspond to indoor space information corresponding to a building, image indoor map attribute information, indoor map provider information, image indoor maps based on multiple floors, image indoor maps based on the LoDs of images, and POIs based on the multiple floors.

When pieces of information, such as the indoor space information, the image indoor map attribute information, the indoor map provider information, the image indoor maps based on multiple floors, image indoor maps based on the LoDs of images, and POIs based on multiple floors, are desired to be transferred based on XML, a Unified Modeling Language (UML)-based data model for the XML may be created, and thus pieces of information may be input.

For example, an XML schema in an example of a UML-based data model required for the construction of image indoor maps may be represented by the following Tables 1 to 11.

In this case, Tables 1 to 11 may be created by partitioning a single schema.

TABLE 1

```
<?xml version="1.0"?>
  <xs:schema xmlns:xs="http://www.w3.org/2001/XMLSchema">
    <xs:element name="CRS" type="CRS"/>
    <xs:complexType name="CRS">
      <xs:sequence>
        <xs:element name="IsRelativeOrAbsolute" type="xs:boolean" minOccurs="1" maxOccurs="1"/>
        <xs:element name="AbsoluteCRS" type="xs:string" minOccurs="1" maxOccurs="1"/>
        <xs:element name="RelativeOrigin" type="xs:string" minOccurs="1" maxOccurs="1"/>
        <xs:element name="RelativeCoordinateUnit" type="xs:string" minOccurs="1" maxOccurs="1"/>
        <xs:element name="RelativeOriginType" type="xs:string" minOccurs="1" maxOccurs="1"/>
      </xs:sequence>
    </xs:complexType>
```

Here, Table 1 may indicate the start portion of the XML schema, and may be a portion in which a Coordinate Reference System (CRS) class, among pieces of configuration information of the indoor map, is described. That is, the configuration information may be represented using the classes of the XML schema, and the representative configuration of the configuration information may be input to correspond to elements using complexType.

when mapping and association between indoor/outdoor coordinates are taken into consideration.

Therefore, an IndoorImageMap class may include, as elements thereof, additional information or an additional description (Description), an update date (UpdateDate), the version of the indoor map (Version), the outward shape (Outline), the total number of floors (NumOfFloors), the start floor number (StartFloorNo), the end floor number (EndFloorNo), mapping information (MappingInfo), etc., which correspond to the representative configuration of the image indoor map attribute information.

Here, the additional description or additional information may be the additional description of the configuration of the indoor map.

Here, the update date may be the date of construction or update of the indoor map.

Here, the indoor map version may be the version of the indoor map.

Here, the outline may be the outline of the indoor map, which is represented by a set of image indoor maps.

Here, the total number of floors may be the total number of floors represented by internal image indoor maps.

TABLE 2

```
<xs:element name="IndoorImageMap" type="IndoorImageMap"/>
<xs:complexType name="IndoorImageMap">
  <xs:sequence>
    <xs:element name="Description" type="xs:string" minOccurs="0" maxOccurs="1"/>
    <xs:element name="UpdateDate" type="xs:date" minOccurs="1" maxOccurs="1"/>
    <xs:element name="Version" type="xs:string" minOccurs="1" maxOccurs="1"/>
    <xs:element name="outline" type="xs:string" minOccurs="1" maxOccurs="1"/>
    <xs:element name="NumOfFloors" type="xs:integer" minOccurs="1" maxOccurs="1"/>
    <xs:element name="StartFloorNo" type="xs:string" minOccurs="1" maxOccurs="1"/>
    <xs:element name="EndFloorNo" type="xs:string" minOccurs="1" maxOccurs="1"/>
    <xs:element name="MappingInfo" type="xs:string" minOccurs="1" maxOccurs="1"/>
    <xs:element name="indoorspace" type="IndoorSpaceInfo" minOccurs="1" maxOccurs="1"/>
    <xs:element name="floorimage" type="IndoorFloorImage" minOccurs="0" maxOccurs="unbounded"/>
    <xs:element name="floorpoi" type="IndoorFloorPOIs" minOccurs="0" maxOccurs="unbounded"/>
  </xs:sequence>
</xs:complexType>
```

In this case, Table 2 may indicate the image indoor map attribute information among pieces of configuration information of the indoor map.

The image indoor map attribute information may mean the attribute information about image-format indoor maps, which are structured or packaged, and indoor POIs. Further, the image indoor map attribute information may include a coordinate mapping portion or the like that enables the calculation of the coordinates of outdoor space to which specific portions of image-format indoor maps correspond Here, the start floor number and the end floor number may be a number of a start floor and a number of an end floor, respectively, which are represented by the internal image indoor maps.

Here, the mapping information may correspond to pieces of information that are used to map the image indoor maps to outdoor space, and may basically include link points between the image indoor maps and the outdoor space, the types of coordinate systems for describing the outline, the locations of the link points between the image indoor maps and the outdoor space, the unit of relative coordinates when the link points comply with the relative coordinates, the angle between due north and the outline, etc. Further, the locations of the link points between the image indoor maps and the outdoor space correspond to the locations in the outline, and may indicate, for example, whether the link points are located at the center of the outline or are located at certain corners of the outline.

is, the pieces of image indoor map information for respective floors may correspond to a group of image indoor maps of a specific floor, such as a first floor or a second floor. Here, the pieces of image indoor map information for respective floors may include various image-format indoor maps in which the corresponding floors are represented again depending on LoDs.

TABLE 3

```
<xs:element name="IndoorImageMapProvider" type="IndoorImageMapProvider"/>
<xs:complexType name="IndoorImageMapProvider">
    <xs:sequence>
        <xs:element name="ID" type="xs:string" minOccurs="1" maxOccurs="1"/>
        <xs:element name="Name" type="xs:string" minOccurs="1" maxOccurs="1"/>
        <xs:element name="Address" type="xs:string" minOccurs="0" maxOccurs="1"/>
        <xs:element name="Description" type="xs:string" minOccurs="0" maxOccurs="1"/>
        <xs:element name="imagemap" type="IndoorImageMap" minOccurs="1" maxOccurs="1"/>
    </xs:sequence>
</xs:complexType>
```

In this case, Table 3 may indicate the indoor map provider information among the pieces of configuration information of the indoor map.

The indoor map provider information may literally be information about the person who provides the indoor map.

Therefore, an IndoorImageMapProvider class may include, as elements thereof, not only the identifier (ID), name, address, and additional information (Description) of the provider, which correspond to the representative configuration of the indoor map provider information, but also the provided indoor maps (imagemap) or the like.

Therefore, an IndoorFloorImage class may include, as elements thereof, a floor number (FloorNo), additional information (Description), display information (DispInfo), the number of LoDs (NumOfLoD), images, etc.

Here, the floor number may be the number of a floor that an image of the corresponding indoor map is intended to represent.

The additional information (Description) may represent additional attributes for each image.

TABLE 4

```
<xs:element name="IndoorFloorImage" type="IndoorFloorImage"/>
<xs:complexType name="IndoorFloorImage">
    <xs:sequence>
        <xs:element name="FloorNo" type="xs:string" minOccurs="1" maxOccurs="1"/>
        <xs:element name="Description" type="xs:string" minOccurs="0" maxOccurs="1"/>
        <xs:element name="DispInfo" type="xs:string" minOccurs="0" maxOccurs="1"/>
        <xs:element name="NumOfLoD" type="xs:integer" minOccurs="1" maxOccurs="1"/>
        <xs:element name="image" type="IndoorImage" minOccurs="0" maxOccurs="unbounded"/>
    </xs:sequence>
</xs:complexType>
```

In this case, Table 4 may indicate information about image indoor maps of respective floors based on multiple floors among the pieces of configuration information of the indoor map.

The pieces of image indoor map information for respective floors may mean images representing a specific floor of the indoor space corresponding to a building, and may be configured to be mutually referred to in consideration of the structure of the indoor space represented by the images. That The display information may indicate pieces of additional information when images of the indoor map are displayed on the terminal of the user.

The number of LoDs may be the total number of LoDs for images of the indoor map.

Here, the images may be the images of indoor maps depending on the LoDs.

TABLE 5

```
<xs:element name="IndoorFloorPOIs" type="IndoorFloorPOIs"/>
<xs:complexType name="IndoorFloorPOIs">
    <xs:sequence>
        <xs:element name="FloorNo" type="xs:string" minOccurs="1" maxOccurs="1"/>
        <xs:element name="Description" type="xs:string" minOccurs="0" maxOccurs="1"/>
        <xs:element name="NumOfPOIs" type="xs:string" minOccurs="1" maxOccurs="1"/>
        <xs:element name="poi" type="IndoorPOI" minOccurs="0" maxOccurs="unbounded"/>
    </xs:sequence>
</xs:complexType>
```

In this case, Table 5 may indicate information about POIs for respective floors based on multiple floors among the pieces of configuration information of the indoor map.

The pieces of POI information for respective floors may mean POIs corresponding to a specific floor in the indoor space corresponding to a building, similar to the image indoor map information for respective floors.

Therefore, an IndoorFloorPOIs class may include, as elements thereof, a floor number (FloorNo), additional information (Description), the number of POIs (NumOfPOIs), POI information (poi), etc.

Here, the floor number may be the number of a floor on which POIs are present.

The additional information may be an additional description of POIs.

The number of POIs may be the number of POIs present on the corresponding floor.

The POI information may be information about POIs present on the corresponding floor.

TABLE 6

```
<xs:element name="IndoorPOI" type="IndoorPOI"/>
<xs:complexType name="IndoorPOI">
    <xs:sequence>
        <xs:element name="location" type="IndoorLocation" minOccurs="1" maxOccurs="1"/>
        <xs:element name="ID" type="xs:string" minOccurs="1" maxOccurs="1"/>
        <xs:element name="Description" type="xs:string" minOccurs="0" maxOccurs="1"/>
        <xs:element name="Name" type="xs:string" minOccurs="1" maxOccurs="1"/>
        <xs:element name="DispLoDNo" type="xs:integer" minOccurs="1" maxOccurs="1"/>
        <xs:element name="IconPath" type="xs:string" minOccurs="0" maxOccurs="1"/>
        <xs:element name="Icon" type="xs:string" minOccurs="0" maxOccurs="1"/>
    </xs:sequence>
</xs:complexType>
```

In this case, Table 6 may indicate information about indoor POIs among the pieces of configuration information of the indoor map.

Here, the indoor POI information may represent detailed information about the corresponding POI.

Therefore, an IndoorPOI class may include, as elements thereof, a POI location, a POI identifier (ID), an additional description (Description), a POI name (Name), display Levels of Detail (DispLoDNo), the path of a POI icon or a POI image (IconPath or ImagePath), POI icon or POI image data (Icon or ImageData), etc.

The POI location may be the location of each POI in indoor space.

The POI ID and POI name may literally be the ID and the name, respectively, which are required in order to identify the corresponding POI.

The display LoD may denote the LoD of an icon or an image represented by the corresponding POI. That is, by means of the icon or data of the POI, information about the place corresponding to the POI in the indoor map may be represented by an icon or an image.

TABLE 7

```
<xs:element name="IndoorLocation" type="IndoorLocation"/>
<xs:complexType name="IndoorLocation">
    <xs:sequence>
        <xs:element name="type" type="xs:integer" minOccurs="1" maxOccurs="1"/>
        <xs:element name="locationX" type="xs:integer" minOccurs="1" maxOccurs="1"/>
        <xs:element name="locationY" type="xs:integer" minOccurs="1" maxOccurs="1"/>
```

TABLE 7-continued

```
    <xs:element name="locationZ" type="xs:integer" minOccurs="0" maxOccurs="1"/>
    <xs:element name="FloorNo" type="xs:string" minOccurs="0" maxOccurs="1"/>
  </xs:sequence>
</xs:complexType>
```

In this case, Table 7 may indicate the location information of indoor space among the pieces of configuration information of the indoor map. For example, the location information of indoor space may indicate the location of indoor space based on coordinates.

Therefore, an IndoorLocation class may include, as elements thereof, the type, X coordinate (LocationX), Y coordinate (LocationY), Z coordinate (LocationZ), floor number (FloorNo), etc. of indoor space.

Here, the floor number may indicate the floor of the building on which the indoor space is located.

TABLE 8

```
<xs:element name="IndoorMapMappingInfo" type="IndoorMapMappingInfo"/>
<xs:complexType name="IndoorMapMappingInfo">
  <xs:sequence>
    <xs:element name="Center" type="xs:string" minOccurs="1" maxOccurs="1"/>
    <xs:element name="Rotation" type="xs:double" minOccurs="1" maxOccurs="1"/>
    <xs:element name="IsRelativeOrAbsolute" type="xs:boolean" minOccurs="1" maxOccurs="1"/>
    <xs:element name="AbsoluteCRS" type="xs:string" minOccurs="1" maxOccurs="1"/>
    <xs:element name="RelativeOrigin" type="xs:string" minOccurs="1" maxOccurs="1"/>
    <xs:element name="RelativeCoordinateUnit" type="xs:string" minOccurs="1" maxOccurs="1"/>
    <xs:element name="RelativeOriginType" type="xs:string" minOccurs="1" maxOccurs="1"/>
  </xs:sequence>
</xs:complexType>
```

In this case, Table 8 may indicate indoor map mapping information among the pieces of configuration information of the indoor map.

The indoor map mapping information may be information used when image indoor maps are mapped to outdoor space.

Therefore, an IndoorMapMappingInfo class may include, as elements thereof, devices (Center, Rotation) for adjusting the locations of the link points between the image indoor maps and outdoor space, the specification of any one of an absolute value and a relative value (IsRelativeOrAbsolute), a CRS absolute value (AbsoluteCRS), the relative value of an origin (RelativeOrigin), the relative coordinates of a unit (RelativeCoordinateUnit), the type of a relative origin (RelativeOROrginType), etc.

TABLE 9

```
<xs:element name="IndoorFloorMapDispInfo" type="IndoorFloorMapDispInfo"/>
<xs:complexType name="IndoorFloorMapDispInfo">
  <xs:sequence>
    <xs:element name="Transparency" type="xs:integer" minOccurs="1" maxOccurs="1"/>
  </xs:sequence>
</xs:complexType>
```

In this case, Table 9 may indicate indoor map display information among the pieces of configuration information of the indoor map.

That is, the indoor map display information may correspond to information required when the indoor map is displayed on the terminal of the user.

Therefore, an IndoorFloorMapDispInfo class may include an element, such as transparency.

TABLE 10

```
<xs:element name="IndoorImage" type="IndoorImage"/>
<xs:complexType name="IndoorImage">
  <xs:sequence>
    <xs:element name="ID" type="xs:string" minOccurs="1" maxOccurs="1"/>
    <xs:element name="LoDNo" type="xs:integer" minOccurs="1" maxOccurs="1"/>
    <xs:element name="ImageType" type="xs:string" minOccurs="1" maxOccurs="1"/>
    <xs:element name="ImageResolutionX" type="xs:integer" minOccurs="1" maxOccurs="1"/>
    <xs:element name="ImageResolutionY" type="xs:integer" minOccurs="1" maxOccurs="1"/>
    <xs:element name="ImagePath" type="xs:string" minOccurs="0" maxOccurs="1"/>
    <xs:element name="ImageData" type="xs:string" minOccurs="0" maxOccurs="1"/>
    <xs:element name="ImageSize" type="xs:Integer" minOccurs="1" maxOccurs="1"/>
    <xs:element name="DispInfo" type="xs:string" minOccurs="0" maxOccurs="1"/>
  </xs:sequence>
</xs:complexType>
```

In this case, Table 10 may indicate images of the indoor map among the pieces of configuration information of the indoor map.

Therefore, an IndoorImage class may include, as elements thereof, an image identifier (ID), an image LoD (LoDNo), an image type (ImageType), an image resolution (ImageResolutionX, ImageResolutionY), image data (ImageData), an image size (ImageSize), image display information (DispInfo), etc.

The image type may indicate various image types, such as jpg, pcx, and png.

Here, the image data may correspond to binary data about the corresponding image, that is, the image data itself.

indoor space name (IndoorSpaceName), an additional description (Description), etc.

Further, the indoor map DB 220 may sequentially input indoor space information, image indoor map attribute information, image indoor maps, indoor POIs, and indoor map provider information, which correspond to a building, to a binary file, wherein the image indoor maps and the indoor POIs may be successively input for respective floors.

Here, in order to improve the speed of access to the image indoor maps, the binary file may include floor descriptors, to which the start locations of image indoor maps of respective floors are input, in a heading portion of the image indoor maps, and may include LoD descriptors, to which the start locations of the image indoor maps for respective LoDs are input, in a portion subsequent to the floor descriptors.

That is, since the image indoor maps or indoor POIs in the binary file are successive for respective floors, a lot of time may be required in order to search the binary file for a desired location after starting from a heading portion thereof. Therefore, in order to promptly access the maps or POIs, the speed of access to image indoor maps or indoor

TABLE 11

```
<xs:element name="IndoorSpaceInfo" type="IndoorSpaceInfo"/>
<xs:complexType name="IndoorSpaceinfo">
  <xs:sequence>
    <xs:element name="IndoorSpaceID" type="xs:string" minOccurs="1" maxOccurs="1"/>
    <xs:element name="IndoorSpaceAddress" type="xs:string" minOccurs="1" maxOccurs="1"/>
    <xs:element name="IndoorSpaceName" type="xs:string" minOccurs="1" maxOccurs="1"/>
    <xs:element name="Description" type="xs:string" minOccurs="1" maxOccurs="1"/>
  </xs:sequence>
</xs:complexType>
</xs:schema>
```

In this case, Table 11 may indicate indoor space information among the pieces of configuration information of the indoor map.

The indoor space information may mean information about indoor space represented by image indoor maps which are structured or packaged according to the present invention.

Therefore, an IndoorSpaceInfo class may include, as elements thereof, an indoor space identifier (IndoorSpaceID), an indoor space address (IndoorSpaceAddress), an POIs in the binary file may be improved by means of a descriptor that describes the start location of a desired floor or a desired LoD.

The indoor map acquisition unit 230 may acquire an indoor map corresponding to a building in response to an indoor map request from the indoor map DB 220.

Here, all of the indoor space information, image indoor map attribute information, image indoor maps, and indoor POIs, which correspond to the configuration information of the indoor map, may be acquired.

Here, the indoor map DB 220 is searched based on information corresponding to the indoor map request, and an indoor map associated with found information may be acquired. That is, since the configuration information of the indoor map may be structured and stored in the indoor map DB 220, an indoor map associated with information found as the result of the search may be acquired if any one of pieces of configuration information of the indoor map is searched for in response to the indoor map request.

The indoor map provision unit 240 may provide the terminal of the user with information about at least one of multiple indoor maps, in which multiple floors and LoDs of images are taken into consideration based on the indoor map, and POIs for respective multiple floors.

Here, the image indoor maps for respective LoDs are provided, and thus the images of the indoor map may be provided without being distorted even if the user may magnify or reduce the images of the indoor map.

Each of the multiple image indoor maps may include at least one of a floor number corresponding to the image indoor map, the number of LoDs, the LoD of the image indoor map, the image type of the image indoor map, the image resolution of the image indoor map, the image path of the image indoor map, the image data of the image indoor map, the image size of the image indoor map, and additional information.

Here, each of the POIs for respective multiple floors may include at least one of the number of the floor on which the POI is present, the total number of POIs corresponding to the floor on which each POI is present, a POI identifier, a POI type, a POI location, a POI name, a POI image path, POI data, and additional information.

Here, the image indoor map attribute information may include not only attribute information corresponding to at least one of multiple image indoor maps and POIs for respective multiple floors, but also mapping information required in order to map the multiple image indoor maps to the outdoor space.

Here, the indoor map provider information may include at least one of the identifier, name, address, contact information, and additional information of each provider.

In this way, an indoor map, which must be essentially provided in order to visualize and refer to indoor space in various types of indoor location-based services that are provided for indoor space through the image-based indoor map provision apparatus according to the present invention, may be configured and represented in the form of images.

Further, image indoor maps capable of representing indoor space having the characteristics of a 3D structure, such as a stacked structure, at various LoDs without being distorted may be provided.

Furthermore, by utilizing the method for structuring and packaging images which represent indoor space, the expenses required to construct and utilize the indoor map may be reduced by exchanging the image indoor maps, which are constructed by various entities, together with clear meanings thereof.

Figure 3:
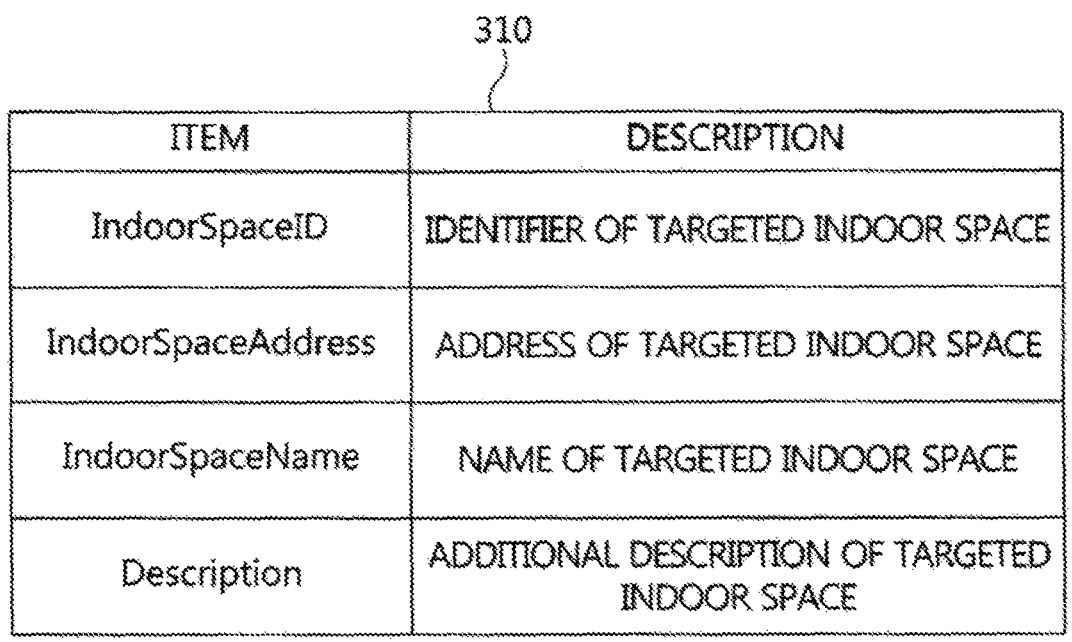
FIG. 3 is a diagram showing a representative configuration of indoor space information according to an embodiment of the present invention.

FIG. 3 is a diagram showing a representative configuration of indoor space information according to an embodiment of the present invention.

Referring to FIG. 3, indoor space information 310 according to an embodiment of the present invention may include an indoor space identifier (ID), an indoor space address, an indoor space name, and an additional description, as representative elements thereof.

Here, the indoor space information 310 may mean information about indoor space, that is, a building, represented by image indoor maps which are structured or packaged according to the present invention.

FIG. 4 is a diagram showing a representative configuration of image indoor map attribute information according to an embodiment of the present invention.

Referring to FIG. 4, image indoor map attribute information 410 according to an embodiment of the present invention may include, as representative elements thereof, an update date, the version of an indoor map, the total number of floors, a star floor number, an end floor number, mapping information, an outline, and an additional description.

Here, the image indoor map attribute information 410 may mean the attribute information of image-format indoor maps or indoor POIs which are structured or packaged.

Here, the mapping information enables the coordinates of outdoor space, to which a specific portion of image-format indoor maps corresponds, to be calculated and checked when the mapping and association between indoor/outdoor coordinates are taken into consideration.

FIG. 5 is a diagram showing a representative configuration of image indoor maps according to an embodiment of the present invention.

Referring to FIG. 5, image indoor maps 510 according to an embodiment of the present invention may include, as representative elements thereof, a floor number, the number of LoDs, an image LoD, an image type, an image resolution, an image path, the image data, an image size, an additional description, and additional information (attributes).

The image indoor maps 510 may be images required to represent a specific floor of the corresponding indoor space, that is, a building, or a specific portion of a specific floor thereof, at a specific LoD. Further, respective image indoor maps may be configured to be mutually referred to in consideration of the structure of the indoor space, which is represented by the images.

That is, image indoor maps may be grouped into image indoor maps of respective floors based on a specific floor, such as a first floor or a second floor, and image indoor maps of respective floors may include various image-format indoor maps, which represent respective LoDs, depending on LoDs. Here, the image indoor maps of respective floors and the image indoor maps for respective LoDs may include additional attribute information depending on the features of indoor location-based services that use the respective image indoor maps.

FIG. 6 is a diagram showing a representative configuration of indoor POIs according to an embodiment of the present invention.

Referring to FIG. 6, indoor POIs 610 according to an embodiment of the present invention may include Points of Interest (POIs) present in a targeted indoor space, that is, a building, similar to the image indoor maps.

Here, the indoor POIs 610 may internally include POI groups for respective floors, similar to the structures of the image indoor maps of respective floors.

Figure 7:
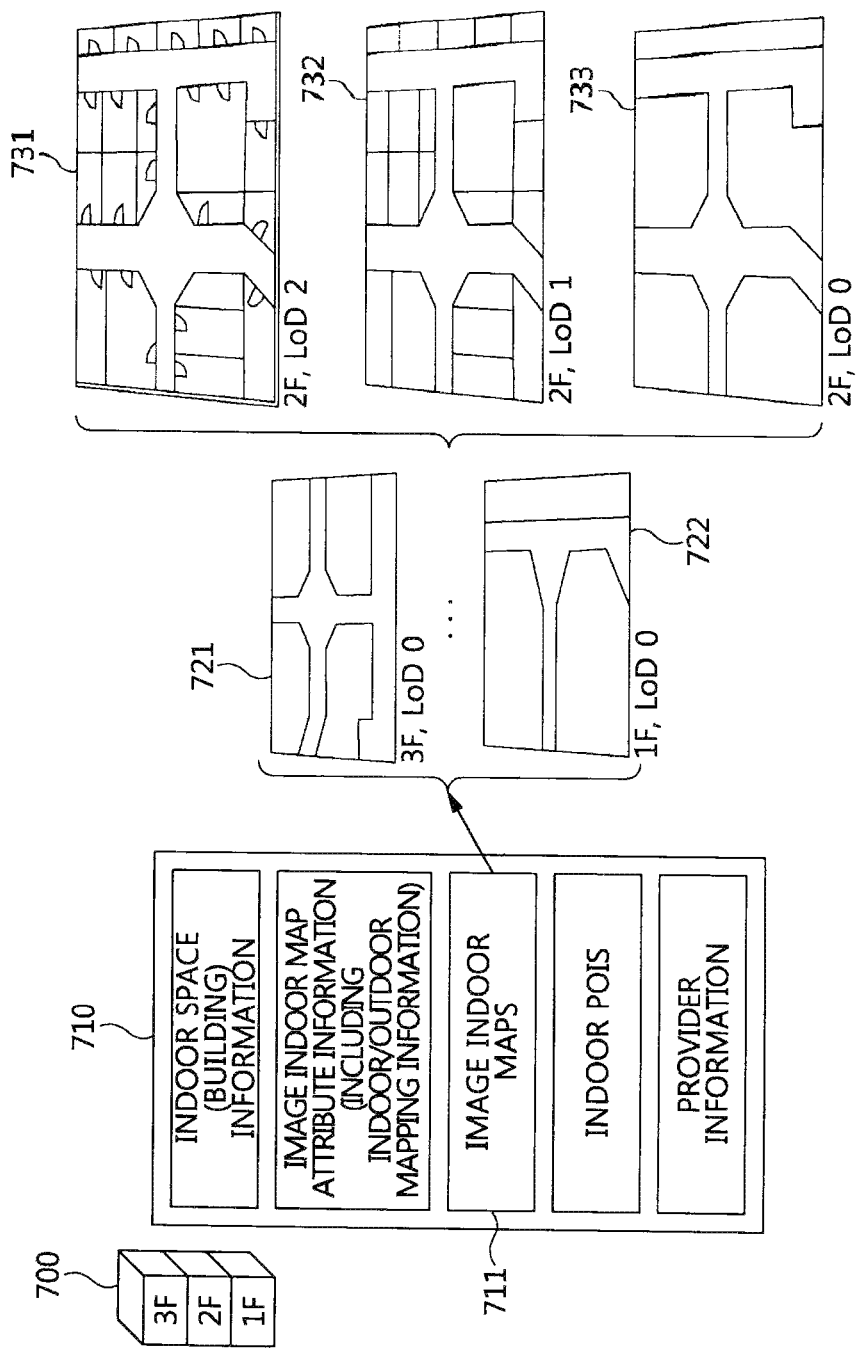
FIG. 7 is a diagram showing the configuration of an image indoor map according to an embodiment of the present invention.

FIG. 7 is a diagram showing the configuration of an image indoor map according to an embodiment of the present invention.

Referring to FIG. 7, an image indoor map 711 according to an embodiment of the present invention may be represented by indoor maps of various floors and indoor maps for various LoDs.

For example, as shown in FIG. 7, referring to the configuration of an image indoor map 711 for a building 700 configured to have three floors, it can be seen that the image indoor map 711 includes a first floor image indoor map 722 to a third floor image indoor map 721 for respective floors.

Here, an image indoor map of each floor may be composed of images of respective portions of the corresponding floor. That is, even the first floor image indoor map 722 may include indoor maps of respective locations on the first floor in correspondence with the formats of respective images.

Further, the image indoor map 711 may include image indoor maps depending on respective LoDs for each floor of the building 700.

For example, as shown in FIG. 7, the image indoor map of the second floor of the building 700 may include an LoD 2 image indoor map 731 for the second floor, an LoD 1 image indoor map 732 for the second floor, and an LoD 0 image indoor map of the second floor.

In this case, as the level of an LoD becomes higher, a visualization level may also become higher. That is, as the LoD becomes higher, the indoor map may be shown at a higher magnification. As shown in FIG. 7, in the LoD 0 image indoor map 733 for the second floor, only a path through which a user can move is indicated, whereas in the LoD 2 image indoor map 731 for the second floor, shops located on the second floor and even the entrances of the shops may be indicated in detail.

In this way, in the image-based indoor maps of indoor space, described above with reference to FIG. 7, a map of indoor space formed as a 3D structure, as in the case of a multi-story building composed of multiple floors, may be represented as a set of 2D-based image maps. Further, in order to solve the disadvantage whereby images are distorted when image-format indoor maps are magnified or reduced, the indoor maps are structured or packaged so that multiple images usable for respective LoDs may be referred to, thus enabling image-format maps to be rapidly utilized without being distorted in various indoor location-based services.

Furthermore, in the indoor map according to the present invention, mapping information, by which the coordinates of outdoor space to which a specific image portion corresponds can be checked, may be provided together as the element of the image indoor map attribute information. Consequently, even in service requiring the association of indoor/outdoor spaces, the indoor/outdoor spaces may be continuously calculated or referred to.

FIGS. 8 to 17 are diagrams showing examples of a UML-based data model for transferring the configuration of an indoor map according to the present invention based on XML.

Referring to FIGS. 8 to 17, when pieces of configuration information of an indoor map according to the present invention are desired to be transferred based on XML, a UML-based data model for such configuration may individually describe the pieces of configuration information of the image indoor map through various classes.

Figure 8:
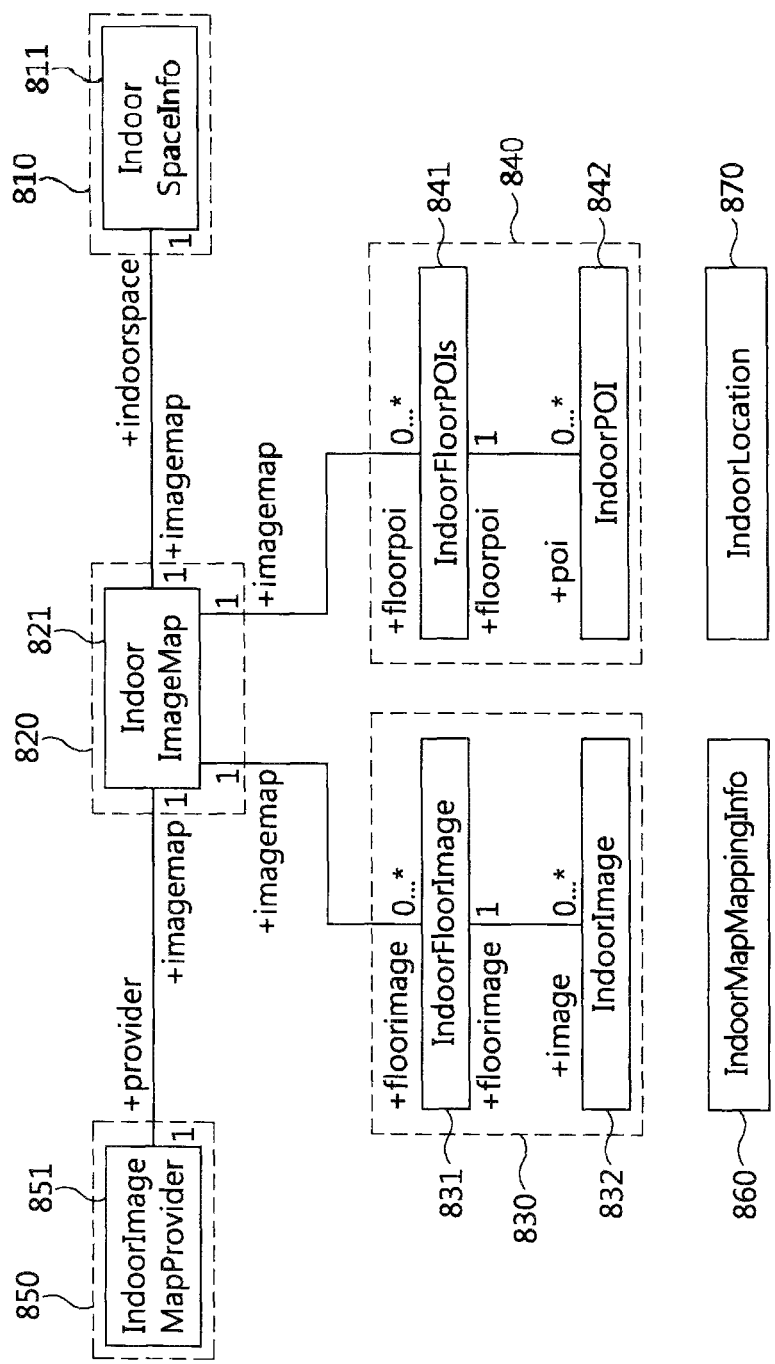
FIGS. 8 to 17 are diagrams showing examples of a UML-based data model required to transfer the configuration of an indoor map based on XML according to the present invention.

That is, referring to FIG. 8, the UML-based data model of an indoor map according to the present invention may include an IndoorSpaceInfo class 811 described to correspond to indoor space information 810, an IndoorImageMap class 821 described to correspond to image indoor map attribute information 820, an IndoorFloorImage class 831 and an IndoorImage class 832 described to correspond to an image indoor map 830, an IndoorFloorPOIs class 841 and an IndoorPOI class 842 described to correspond to an indoor POI 840, and an indoor IndoorImageMapProvider class 851 described to correspond to indoor map provider information 850, in addition to an IndoorMapMappingInfo class 860 described to correspond to the mapping information of the indoor map and an IndoorLocation class 870 described to correspond to the location information of the indoor space.

Figure 9:
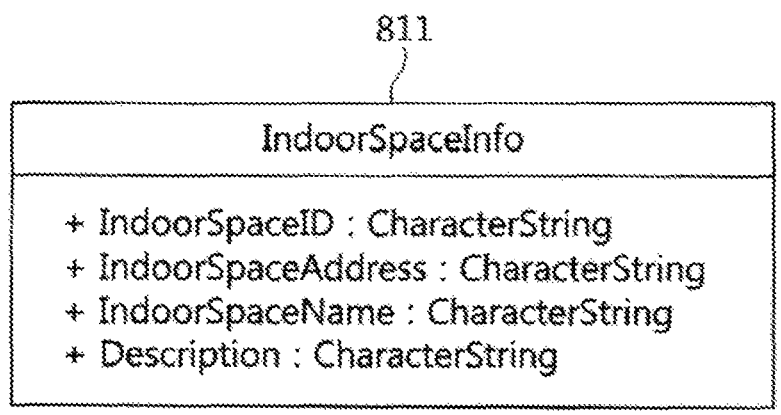
Figure 10:
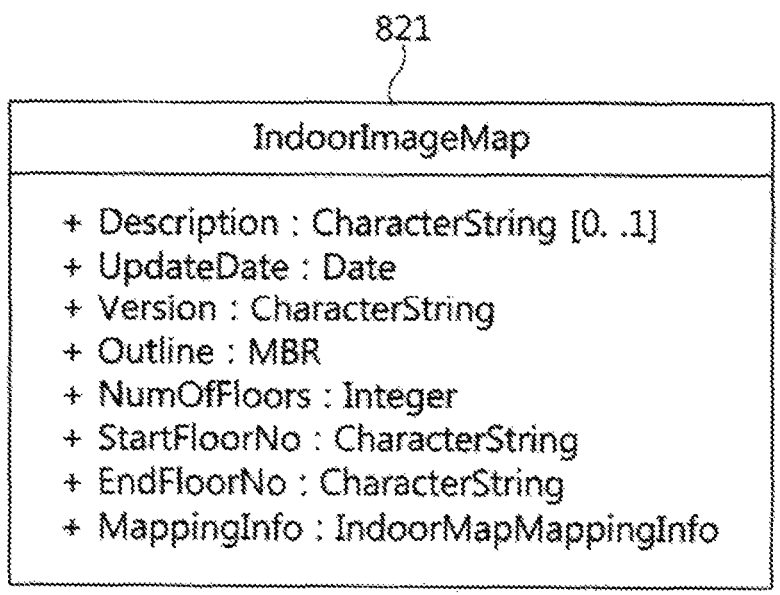

Here, the IndoorSpaceInfo class 811 shown in FIG. 9 may have a one-to-one correspondence relationship with the IndoorImageMap class 821 shown in FIG. 10. For example, image indoor map attribute information and indoor space information, which individually correspond to indoor map named 'A', are on an equal footing with each other, and any one of the image indoor map attribute information and the indoor space information may not belong to the other.

Figure 11:
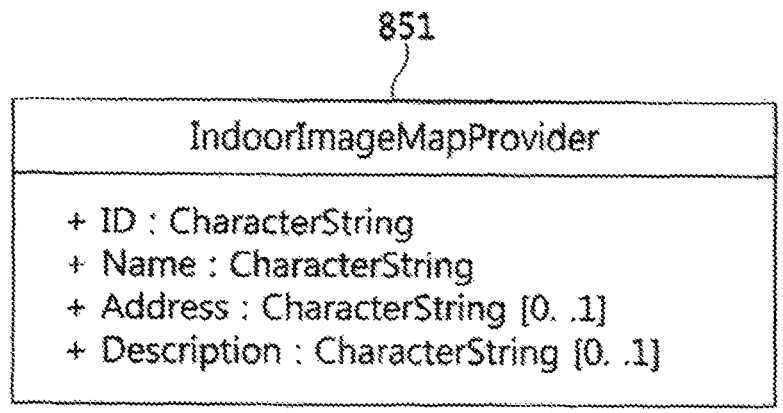

Further, the IndoorImageMapProvider class 851 shown in FIG. 11 may have a one-to-one relationship with the IndoorImageMap class 821 shown in FIG. 10.

Figure 12:
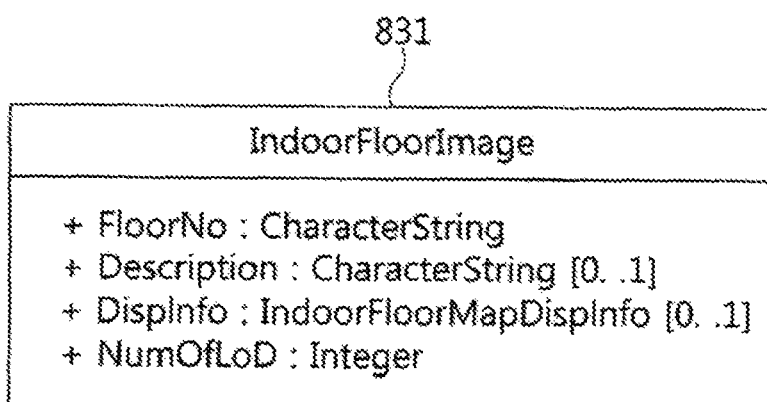

However, the IndoorFloorImage class 831 shown in FIG. 12 may have an N-to-1 relationship with the IndoorImageMap class 821 shown in FIG. 10. For example, image indoor map attribute information corresponding to indoor map named 'B' may be applied in common to multiple image indoor maps of respective floors.

Figure 14:
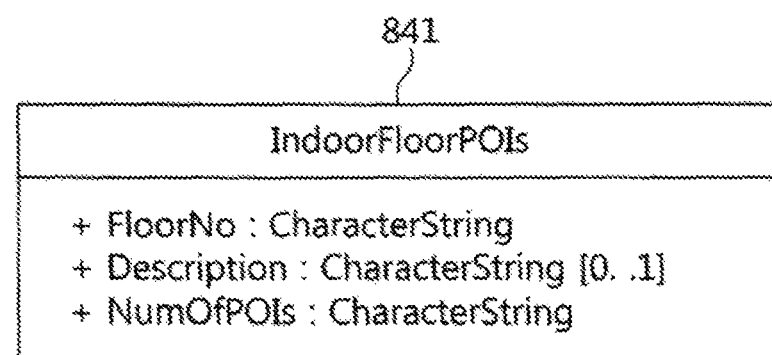

Such a relationship may be similarly applied to the IndoorFloorPOIs class 841 shown in FIG. 14.

Figure 13:
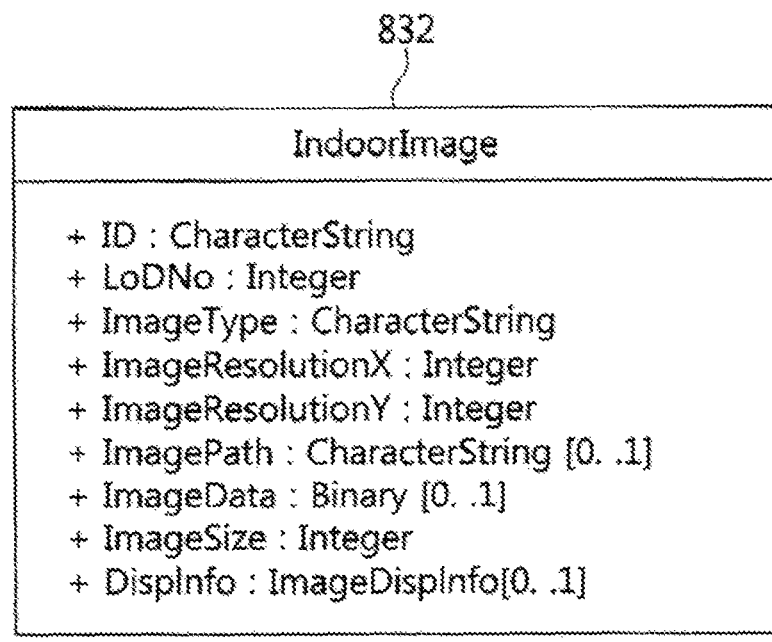

Further, similar to this relationship, the IndoorImage class 832 shown in FIG. 13 may have an N-to-1 relationship with the IndoorFloorImage class 831 shown in FIG. 12. That is, the IndoorFloorImage class 831 may be related to image indoor maps of respective floors, and the IndoorImage class 832 may be related to image indoor maps for respective LoDs on a specific floor.

For example, assuming that a 3-story building named 'C' is present, an image indoor map of a first floor, an image indoor map of a second floor, and an image indoor map of a third floor may be present for respective floors, and the image indoor maps of respective floors may correspond to the values of the IndoorFloorImage class 831. At this time, the image indoor map of the first floor may include multiple image indoor maps of respective locations depending on the number of LoDs, and the image indoor maps for respective LoDs may correspond to the values of the IndoorImage class 832.

Figure 15:
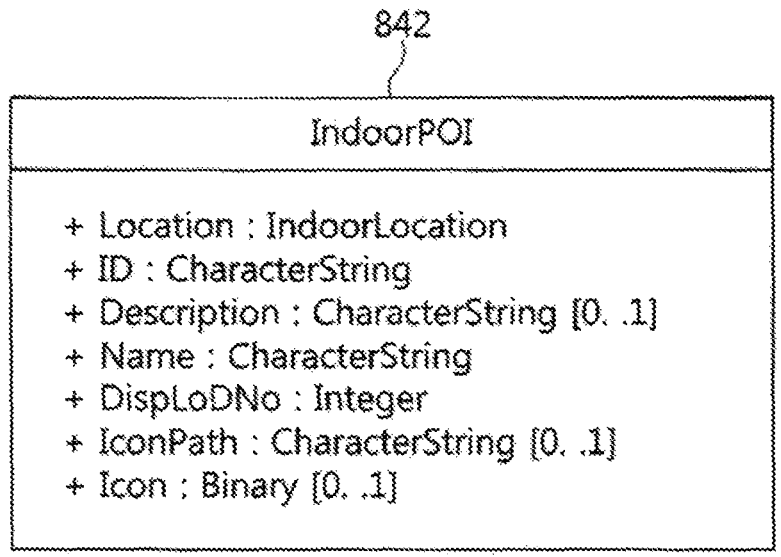

This relationship may be similarly applied to the IndoorPOI class 842 shown in FIG. 15.

Figure 16:
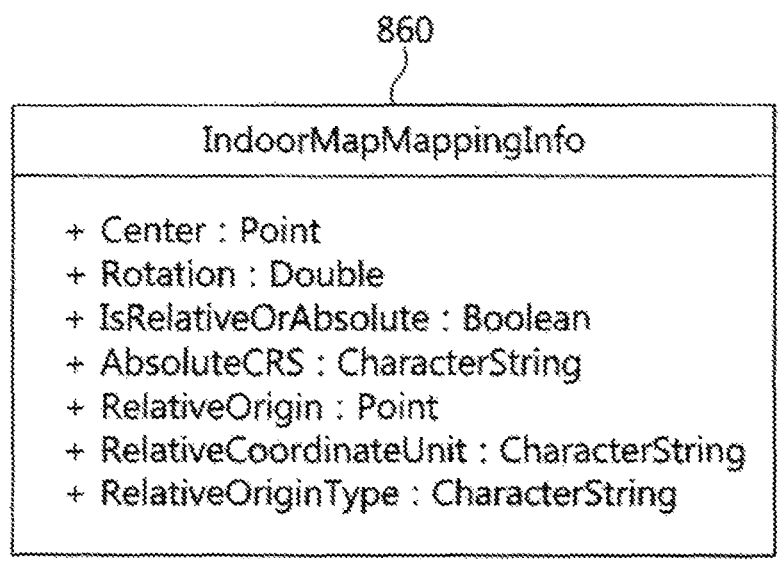
Figure 17:
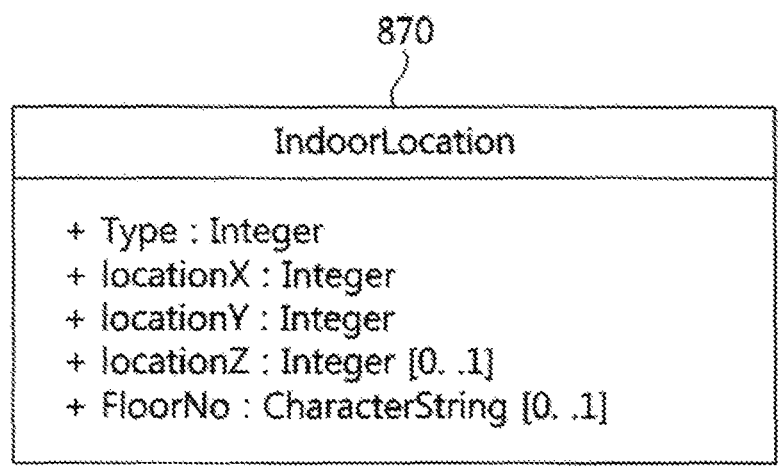

Further, although not shown as an entity relationship in the UML-based data model, the IndoorMapMappingInfo class 860 and the IndoorLocation class 870 respectively shown in FIGS. 16 and 17, together with the indoor map shown in FIG. 8, may be provided to the terminal of the user and may be used to provide indoor location-based service.

Figure 18:
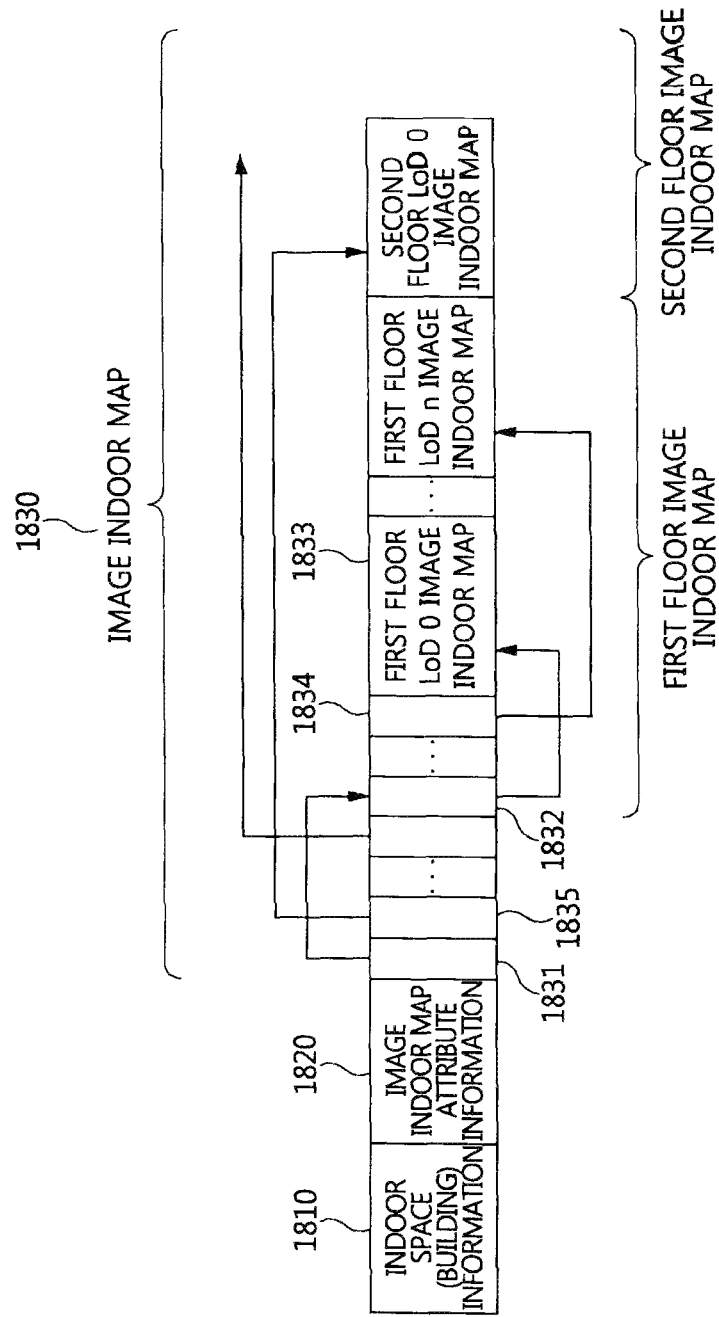
FIG. 18 is a diagram showing the configuration of an image indoor map using a binary file according to an embodiment of the present invention.

FIG. 18 is a diagram showing the configuration of an image indoor map using a binary file according to an embodiment of the present invention.

Referring to FIG. 18, pieces of information about the configuration (elements) of an image indoor map according to an embodiment of the present invention may be sequentially configured in a binary file, as in the case of a normal file.

Here, in the binary file, after indoor space information 1810 and image indoor map attribute information 1820 have been described, a portion corresponding to an image indoor map 1830 may be described.

Here, the image indoor map 1830 may be described such that image indoor maps are successively described for respective floors of indoor space. That is, an image map corresponding to the first floor may be described first, and then image maps may be described in the sequence of the second floor and the third floor.

In this case, since the sizes of image indoor maps present for respective floors or respective LoDs may be different from each other, it may be difficult to search for the location of a desired image indoor map using only the size of data.

Therefore, in order to promptly access desired image indoor maps in the binary file, floor descriptors 1831 and 1835, which describe the start points of image indoor maps of respective floors, may be included in the heading portion of the image indoor map 1830.

For example, as shown in FIG. 18, the current location may be moved to the start location of the image indoor map of the first floor through the floor descriptor 1831, and may be moved to the start location of the image indoor map of the second floor through the floor descriptor 1835.

Further, at the start location of each floor, LoD descriptors 1832 and 1834, which describe the start points of image indoor maps for respective LoDs, may be included.

For example, in the binary file shown in FIG. 18, to search for an image indoor map of an LoD of 0 on the first floor and, the current location may be moved to the start point of the image indoor map of the first floor through the floor descriptor 1831. Thereafter, the image indoor map corresponding to the LoD of 0 on the first floor may be immediately accessed through the LoD descriptor 1832.

In this way, by more promptly accessing desired image indoor maps through floor descriptors and LoD descriptors, the speed of service provision may be improved when indoor location-based service is actually provided.

Figure 19:
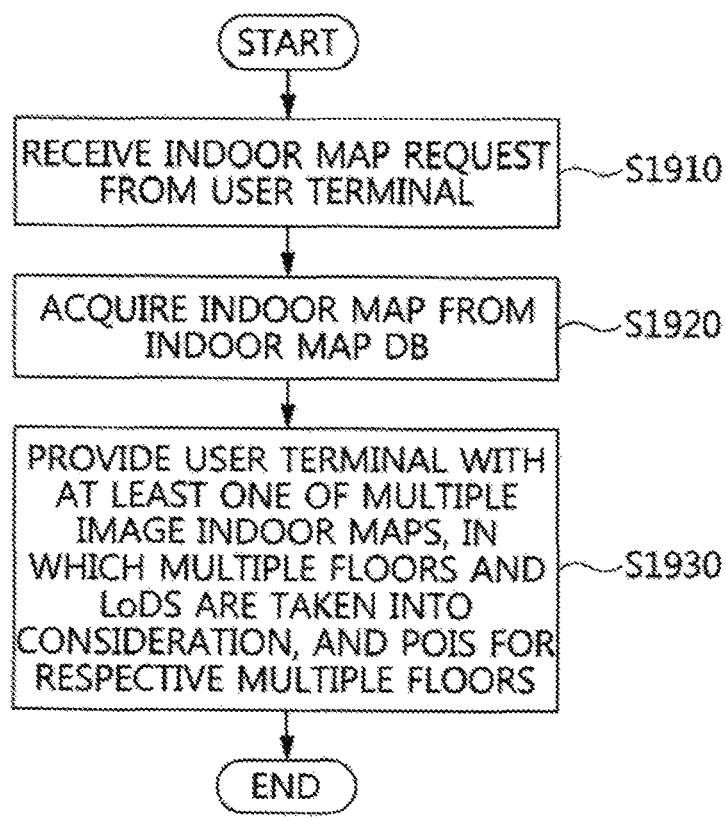
FIG. 19 is an operation flowchart showing a method for providing an image-based indoor map according to an embodiment of the present invention.

FIG. 19 is an operation flowchart showing a method for providing an image-based indoor map according to an embodiment of the present invention.

Referring to FIG. 19, the image-based indoor map provision method according to the embodiment of the present invention receives an indoor map request for a multi-story building having multiple floors from the terminal of a user at step S1910.

Here, the indoor map request may include information about the building provided from the user terminal. For example, when the user inputs identification information required to identify the building, such as the name or address of the building, via the terminal, the input information may be transmitted to an indoor map provision apparatus, with the information included in the indoor map request.

Further, the indoor map request may be received from the terminal of the user over a network.

Here, the network may be a path through which data is transferred between the indoor map provision apparatus and the user terminal, and is a concept including all existing networks and networks that may be developed in the future. For example, the network may be any one of a wired/wireless LAN for providing communication between various types of information devices in a limited area, a mobile communication network for providing communication between individual moving objects and between a moving object and the system outside the moving object, a satellite communication network for providing communication between individual earth stations using satellites, and a wired/wireless communication network, or may be a combination of two or more such networks. Meanwhile, transmission system standards for the network are not limited to existing transmission system standards and may include all transmission system standards that will be developed in the future.

Then, the image-based indoor map provision method according to the embodiment of the present invention acquires an indoor map corresponding to the building in response to an indoor map request from the indoor map DB at step S1920.

The indoor map DB may generate at least one piece of configuration information corresponding to an indoor map in the form of XML instances corresponding to an XML schema, and may structure and manage the image map based on the XML instances.

Here, the XML instances may be generated to respectively correspond to indoor space information corresponding to a building, image indoor map attribute information, indoor map provider information, image indoor maps based on multiple floors, image indoor maps based on the LoDs of images, and POIs based on the multiple floors.

When pieces of information, such as the indoor space information, the image indoor map attribute information, the indoor map provider information, the image indoor maps based on multiple floors, image indoor maps based on the LoDs of images, and POIs based on multiple floors, are desired to be transferred based on XML, a Unified Modeling Language (UML)-based data model for the XML may be created, and thus pieces of information may be input.

For example, an XML schema in an example of a UML-based data model required for the construction of image indoor maps may be represented by the above-described Tables 1 to 11.

Further, the indoor map DB may sequentially input indoor space information, image indoor map attribute information, image indoor maps, indoor POIs, and indoor map provider information, which correspond to a building, to a binary file, wherein the image indoor maps and the indoor POIs may be successively input for respective floors.

Here, in order to improve the speed of access to the image indoor maps, the binary file may include floor descriptors, to which the start locations of image indoor maps of respective floors are input, in a heading portion of the image indoor maps, and may include LoD descriptors, to which the start locations of the image indoor maps for respective LoDs are input, in a portion subsequent to the floor descriptors.

That is, since the image indoor maps or indoor POIs in the binary file are successive for respective floors, a lot of time may be required in order to search the binary file for a desired location after starting from a heading portion thereof. Therefore, in order to promptly access the maps or POIs, the speed of access to image indoor maps or indoor POIs in the binary file may be improved by means of a descriptor that describes the start location of a desired floor or a desired LoD.

Here, all of the indoor space information, image indoor map attribute information, image indoor maps, and indoor POIs, which correspond to the configuration information of the indoor map, may be acquired.

Here, the indoor map DB is searched based on information corresponding to the indoor map request, and an indoor map associated with found information may be acquired. That is, since the configuration information of the indoor map may be structured and stored in the indoor map DB, an indoor map associated with information found as the result of the search may be acquired if any one of pieces of configuration information of the indoor map is searched for in response to the indoor map request.

Further, the image-based indoor map provision method according to the embodiment of the present invention provides the terminal of the user with information about at least one of multiple image indoor maps, in which multiple floors and LoDs of each image are taken into consideration, and POIs for respective multiple floors, based on the indoor map at step S1930.

Here, the image indoor maps for respective LoDs are provided, and thus the images of the indoor map may be provided without being distorted even if the user may magnify or reduce the images of the indoor map.

Each of the multiple image indoor maps may include at least one of a floor number corresponding to the image indoor map, the number of LoDs, the LoD of the image indoor map, the image type of the image indoor map, the image resolution of the image indoor map, the image path of the image indoor map, the image data of the image indoor map, the image size of the image indoor map, and additional information.

Here, each of the POIs for respective multiple floors may include at least one of the number of the floor on which the POI is present, the total number of POIs corresponding to the floor on which each POI is present, a POI identifier, a POI type, a POI location, a POI name, a POI image path, POI data, and additional information.

Here, the image indoor map attribute information may include not only attribute information corresponding to at least one of multiple image indoor maps and POIs for respective multiple floors, but also mapping information required in order to map the multiple image indoor maps to the outdoor space.

Here, the indoor map provider information may include at least one of the identifier, name, address, contact information, and additional information of each provider.

As described above, by utilizing the method for providing an image-based indoor map according to the present invention, it is possible to construct and represent an indoor map, which is to be essentially provided in order to visualize and refer to indoor space in various types of indoor location-based services provided for the indoor space, in the form of an image.

Further, the present invention may provide an image indoor map, in which indoor space having the characteristics of a three-dimensional (3D) structure, such as a stacked structure, may be represented at various visualization levels (Levels of Detail) without being distorted.

Furthermore, the present invention may exchange image indoor maps that are constructed by various entities together with clear meanings by utilizing a method of structuring and packaging images required to represent indoor space, thus reducing the expense required to construct and utilize indoor maps.

As described above, in the apparatus and method for providing an image-based indoor map according to the present invention, the configurations and schemes in the above-described embodiments are not limitedly applied, and some or all of the above embodiments can be selectively combined and configured so that various modifications are possible.

What is claimed is:

1. An apparatus for providing an image-based indoor map, comprising:
    one or more units being configured and executed by a processor using algorithm associated with at least one non-transitory storage device, the one or more units comprising,
    an indoor map request reception unit for receiving an indoor map request for a building having multiple floors;
    in response to the indoor map request, an indoor map acquisition unit for acquiring an indoor map corresponding to the building from an indoor map database (DB); and
    an indoor map provision unit for providing information including multiple image indoor maps, the image indoor maps including at least one of images of multiple floors and Levels of Detail (LoDs) and Points of Interest (POIs) for respective one of the multiple floors, wherein
    indoor space information corresponding to the building, image indoor map attribute information, image indoor maps, indoor POIs, and indoor map provider information are sequentially stored to a binary file in the indoor map database (DB), wherein the image indoor maps and the indoor POIs are successively stored for respective one of the multiple floors, and
    to improve access speed of searching of the image-based indoor map, the binary file is configured in which floor descriptors are included in a heading portion of the image-based indoor map, the descriptors specifies start locations of the respective floors and Levels of Detail (LoD) descriptors are included in a portion subsequent to the floor descriptors, the LoD descriptors specify start locations of the image indoor maps for respective one of LoDs.

2. The apparatus of claim 1, wherein the indoor map DB is configured to generate at least one piece of configuration information corresponding to the indoor map in a form of eXtensible Markup Language (XML) instances corresponding to an XML schema, and to structure and to manage the indoor map based on the XML instances.

3. The apparatus of claim 2, wherein the XML instances are generated to respectively correspond to indoor space information corresponding to the building, image indoor map attribute information, indoor map provider information, image indoor maps based on the multiple floors, image indoor maps based on the LoDs of each image, and the POIs based on the multiple floors.

4. The apparatus of claim 3, wherein:
    the XML schema comprises an IndoorImageMap class corresponding to the indoor map, the IndoorImageMap class includes at least one of an IndoorFloorImage class corresponding to image indoor maps of respective multiple floors and an IndoorFloorPOIs class corresponding to POIs present on the respective multiple floors, and the IndoorFloorImage class is implemented as a set of values of an IndoorImage class corresponding to image indoor maps based on the LoDs of each image.

5. The apparatus of claim 3, wherein the indoor map comprises mapping information required to map the multiple image indoor maps to outdoor space together with attribute information corresponding to at least one of the multiple image indoor maps and the POIs for respective multiple floors, wherein
    the mapping information and the attribute information are included in the image indoor map attribute information.

6. The apparatus of claim 3, wherein the indoor map comprises information about at least one of an identifier, a name, an address, contact information, and additional information, which are included in the indoor map provider information.

7. The apparatus of claim 3, wherein the indoor map comprises at least one of an identifier, an address, a name, and an additional description of indoor space corresponding to the building, which are included in the indoor space information.

8. The apparatus of claim 1, wherein the indoor map comprises information included in the multiple image indoor maps, the information being at least one of a number of a floor corresponding to each image indoor map, a number of LoDs, an LoD, an image type of the image indoor map, an image resolution of the image indoor map, an image path of the image indoor map, image data of the image indoor map, an image size of the image indoor map, and additional information.

9. The apparatus of claim 1, wherein the indoor map comprises information included in the POIs for respective one of the multiple floors, the information being at least one of a number of a floor on which each POI is present, a number of POIs corresponding to the floor on which each POI is present, a POI identifier, a POI type, a POI location, a POI name, a POI image path, POI image data, and additional information.

10. A computer-implemented method for providing an image-based indoor map, comprising:

receiving an indoor map request transmitted for a building having multiple;

in response to the indoor map request, acquiring an indoor map corresponding to the building in response to the indoor map request from an indoor map database (DB); and providing information including at least one of images of multiple floors and Levels of Detail (LoDs) and Points of Interest (POIs) for respective one of the multiple floors, wherein sequentially storing indoor space information corresponding to the building, image indoor map attribute information, image indoor maps, indoor POIs, and indoor map provider information to a binary file in the indoor map database (DB), and successfully storing the image indoor maps and the indoor POIs for respective one of the multiple floors, and to improve access speed of searching of the image-based indoor map, the binary file is configured in which floor descriptors are included in a heading portion of the image-based indoor map, the descriptors specifies start locations of the respective floors and Levels of Detail (LoD) descriptors are included in a portion subsequent to the floor descriptors, the LoD descriptors specify start locations of the image indoor maps for respective one of LoDs.

11. The method of claim 10, wherein the indoor map DB is configured to generate at least one piece of configuration information corresponding to the indoor map in a form of eXtensible Markup Language (XML) instances corresponding to an XML schema, and to structure and manage the indoor map based on the XML instances.

12. The method of claim 11, wherein the XML instances are generated to respectively correspond to indoor space information corresponding to the building, image indoor map attribute information, indoor map provider information, image indoor maps based on the multiple floors, image indoor maps based on the LoDs of each image, and the POIs based on the multiple floors.

13. The method of claim 12, wherein:

the XML schema comprises an IndoorImageMap class corresponding to the indoor map, the IndoorImageMap class includes at least one of an IndoorFloorImage class corresponding to image indoor maps of respective multiple floors and an IndoorFloorPOIs class corresponding to POIs present on the respective multiple floors, and the IndoorFloorImage class is implemented as a set of values of an IndoorImage class corresponding to image indoor maps based on the LoDs of each image.

14. The method of claim 12, wherein the indoor map comprises mapping information required to map the multiple image indoor maps to outdoor space together with attribute information corresponding to at least one of the multiple image indoor maps and the POIs for respective multiple floors, wherein the mapping information and the attribute information are included in the image indoor map attribute information.

15. The method of claim 10, wherein the indoor map comprises information included in the multiple image indoor maps, the information being at least one of a number of a floor corresponding to each image indoor map, a number of LoDs, an LoD, an image type of the image indoor map, an image resolution of the image indoor map, an image path of the image indoor map, image data of the image indoor map, an image size of the image indoor map, and additional information.

16. The method of claim 10, wherein the indoor map comprises information included in the POIs for respective one of the multiple floors, the information being at least one of a number of a floor on which each POI is present, a number of POIs corresponding to the floor on which each POI is present, a POI identifier, a POI type, a POI location, a POI name, a POI image path, POI image data, and additional information.

* * * * *